United States Patent
Zhao et al.

(10) Patent No.: US 10,698,925 B1
(45) Date of Patent: Jun. 30, 2020

(54) GROUPING-BASED CONTAINER MANAGEMENT AND DATA SERVICES

(71) Applicant: EMC IP Holding Company LLC, Hopkinton, MA (US)

(72) Inventors: Junping Zhao, Beijing (CN); Kevin Xu, Warren, NJ (US); Kenneth Durazzo, San Ramon, CA (US); Kun Wang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 634 days.

(21) Appl. No.: 15/490,241

(22) Filed: Apr. 18, 2017

(51) Int. Cl.
*G06F 16/28* (2019.01)
*G06F 9/455* (2018.01)
*H04L 29/08* (2006.01)
*G06F 16/23* (2019.01)

(52) U.S. Cl.
CPC ........ *G06F 16/285* (2019.01); *G06F 9/45558* (2013.01); *G06F 16/2365* (2019.01); *H04L 67/1097* (2013.01); *G06F 2009/45595* (2013.01)

(58) Field of Classification Search
CPC .............. G06F 16/285; G06F 16/2365; G06F 9/45558; G06F 2009/45595; H04L 67/1097
USPC ........................................................ 707/692
See application file for complete search history.

(56) References Cited

U.S. PATENT DOCUMENTS

| | | | | |
|---|---|---|---|---|
| 8,352,941 B1 * | 1/2013 | Protopopov | ........ | G06F 9/45558 718/1 |
| 9,087,322 B1 * | 7/2015 | Graham | ................. | G06Q 10/10 |
| 9,262,188 B1 * | 2/2016 | Yang | .................... | G06F 9/45533 |
| 9,384,061 B1 * | 7/2016 | Deivanayagam | ..... | G06F 9/5083 |
| 2012/0266161 A1 * | 10/2012 | Baron | ................. | G06F 9/45558 718/1 |
| 2015/0121483 A1 * | 4/2015 | Perez | .................. | H04L 41/5041 726/5 |

(Continued)

OTHER PUBLICATIONS

P. Mell et al., "The NIST Definition of Cloud Computing," U.S. Department of Commerce, Computer Security Division, National Institute of Standards and Technology, Special Publication 800-145, Sep. 2011, 7 pages.

(Continued)

*Primary Examiner* — Michael Pham
(74) *Attorney, Agent, or Firm* — Ryan, Mason & Lewis, LLP

(57) ABSTRACT

An apparatus in one embodiment comprises a plurality of container host devices of at least one processing platform. The container host devices implement a plurality of containers for executing applications on behalf of one or more tenants of cloud infrastructure. The containers are separated into at least first and second distinct container groups based at least in part on results of comparisons of layer structures each characterizing container images of respective different ones of the containers. At least one grouping-based container management action is determined for at least one of the containers based at least in part on which of the container groups includes that container. The grouping-based container management action is applied to one or more of the containers of one of the first and second container groups but not to the containers of the other of the first and second container groups.

20 Claims, 4 Drawing Sheets

(56) References Cited

U.S. PATENT DOCUMENTS

2016/0197995 A1* 7/2016 Lu ..................... H04L 67/1097
709/219

OTHER PUBLICATIONS

U.S. Appl. No. 15/189,447, filed in the name of Junping Zhao et al. on Jun. 22, 2016 and entitled "Accelerated Data Access Operations.".

U.S. Appl. No. 15/195,451, filed in the name of Accela Zhao et al. on Jun. 28, 2016 and entitled "Container Image Layer Compaction.".

* cited by examiner

GROUPING-BASED CONTAINER MANAGEMENT AND DATA SERVICES

FIELD

The field relates generally to information processing systems, and more particularly to information processing systems comprising cloud infrastructure.

BACKGROUND

Information processing systems increasingly utilize reconfigurable virtual resources to meet changing user needs in an efficient, flexible and cost-effective manner. For example, cloud computing environments implemented using various types of virtualization techniques are known. These illustratively include operating system level virtualization techniques such as Linux containers. Such containers may be used to provide at least a portion of the cloud infrastructure of a given information processing system. Other types of virtualization such as virtual machines implemented using a hypervisor can additionally or alternatively be used. However, significant challenges remain in implementation of cloud infrastructure. For example, it is often unduly difficult to manage large numbers of containers in cloud infrastructure comprising dense container deployments. This can also limit the types of data services that can be provided to tenants and other users of the cloud infrastructure.

SUMMARY

Illustrative embodiments provide grouping-based container management and data services in cloud infrastructure. Such arrangements can provide highly efficient container management in dense container deployments, as well as a wide variety of targeted data services tailored to the particular needs of groups of similar containers.

In one embodiment, an apparatus comprises a plurality of container host devices of at least one processing platform. The container host devices implement a plurality of containers for executing applications on behalf of one or more tenants of cloud infrastructure. The containers are separated into at least first and second distinct container groups based at least in part on results of comparisons of layer structures each characterizing container images of respective different ones of the containers. At least one grouping-based container management action is determined for at least one of the containers based at least in part on which of the container groups includes that container. The grouping-based container management action is applied to one or more of the containers of one of the first and second container groups but not to the containers of the other of the first and second container groups.

For example, in some embodiments, first grouping-based container management actions are applied to the containers of the first group and second grouping-based container management actions different than the first grouping-based container management actions are applied to the containers of the second group. Other embodiments can include additional container groups each of which comprises containers that are managed using a different set of grouping-based container management actions.

Different data services may be implemented for different ones of the container groups. Such distinct data services provided for respective first and second container groups may include, for example, first and second distinct data caching services for the respective first and second container groups, first and second distinct storage tiering services for the respective first and second container groups, first and second distinct data deduplication services for the respective first and second container groups, first and second distinct networking services for the respective first and second container groups, and/or first and second distinct data security services for the respective first and second container groups.

In some embodiments, changes in the layer structures are tracked and the comparisons repeated such the groups of containers vary dynamically over time. A given container may be assigned to a particular one of the container groups based at least in part on whether or not its associated layer structure is within a specified similarity threshold of layer structures of respective other containers previously assigned to that container group.

These and other illustrative embodiments described herein include, without limitation, methods, apparatus, systems, and computer program products comprising processor-readable storage media.

DETAILED DESCRIPTION

Illustrative embodiments will be described herein with reference to exemplary information processing systems and associated host devices, storage devices and other processing devices. It is to be appreciated, however, that these and other embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Such systems are considered examples of what are more generally referred to herein as cloud computing environments.

Figure 1:
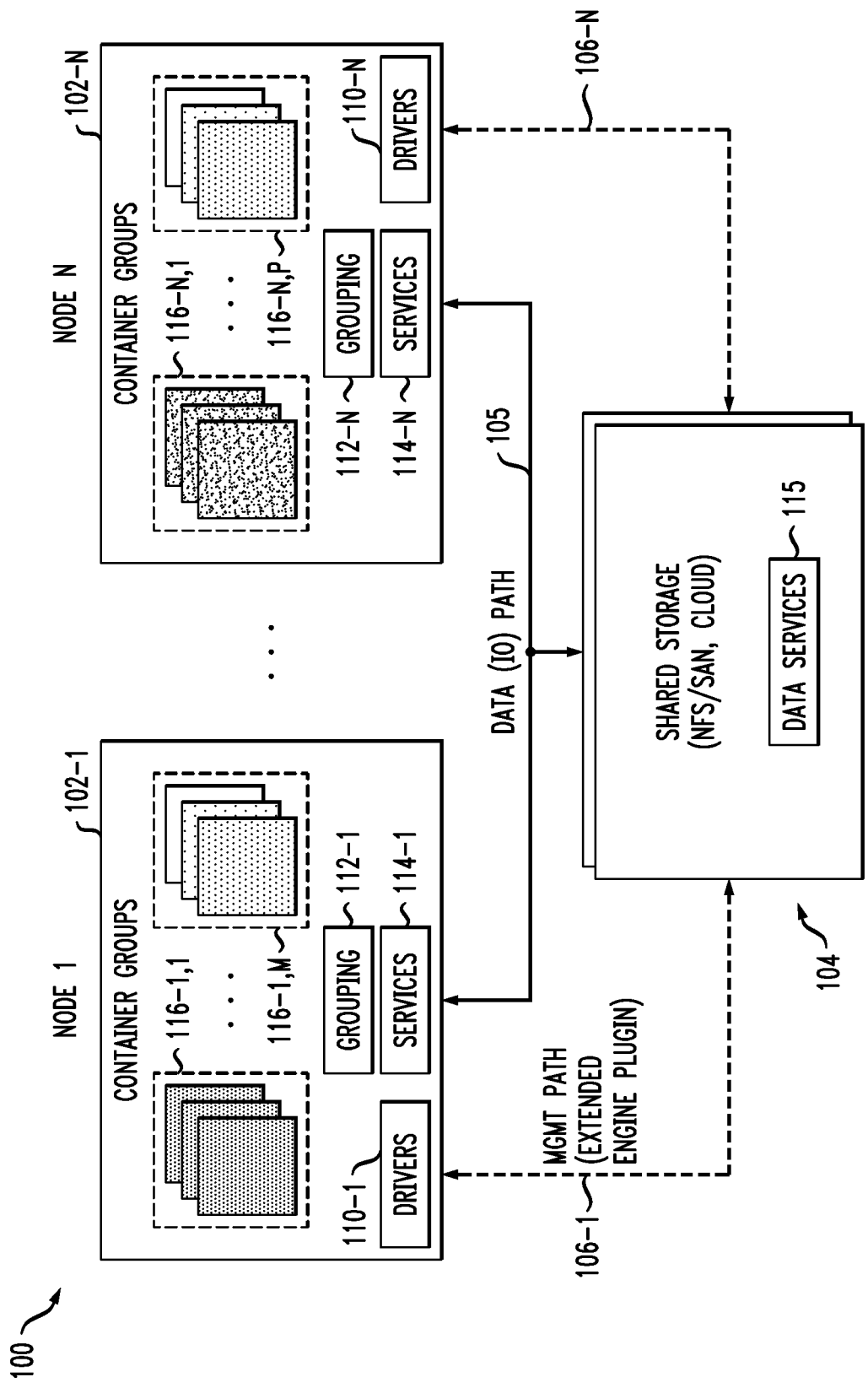
FIG. 1 is a block diagram of an information processing system comprising container groups subject to group-based container management in an illustrative embodiment.

FIG. 1 shows an information processing system 100 configured to implement functionality for grouping-based container management and data services in cloud infrastructure. The system 100 comprises at least one processing platform implementing a plurality of container host devices configured as a plurality of nodes 102-1 through 102-N, also denoted as Node 1, . . . Node N, respectively. The container host devices providing the nodes 102 are examples of what are more generally referred to herein as "processing devices" of the one or more processing platforms of the system 100. Each such processing device of a given processing platform comprises at least one processor coupled to a memory. A given one of the nodes 102 can illustratively comprise a single container host device. Alternatively, one or more of the nodes 102 can each comprise a plurality of container host devices.

At least a subset of the container host devices may comprise respective virtual machines controlled by a hypervisor of the processing platform, although numerous other types of container host devices may be used.

The nodes 102 can illustratively comprise respective compute nodes of the cloud infrastructure. For example, the nodes 102 can comprise respective compute nodes of an Amazon Web Services (AWS) system. Other examples of cloud-based systems that can be used to implement nodes 102 and possibly other portions of system 100 include Google Cloud Platform (GCP) and Microsoft Azure.

The nodes 102 may be implemented on a per-tenant basis and extend in a distributed manner across container host devices of multiple public, private or hybrid clouds.

A given such cloud can comprise a Platform-as-a-Service (PaaS) layer overlying an Infrastructure-as-a-Service (IaaS) layer. The IaaS layer comprises a plurality of virtual machines supporting application containers of the PaaS layer. For example, container host devices in such an embodiment are assumed to correspond to respective ones of the virtual machines of the IaaS layer.

It should be noted that references above and elsewhere herein to container host devices should not be viewed as limiting in any way. Other embodiments can utilize other types of host devices, including virtual machines and "bare metal" hosts. The term "host device" as used herein is therefore intended to be broadly construed.

The nodes 102 in the present embodiment share a common storage system 104, also referred to as "shared storage." The nodes 102 have data access to the storage system 104 via an input-output (IO) data path 105. The nodes 102 also communicate with the storage system 104 via respective management ("Mgmt") paths 106, illustrated by dashed arrows in the figure. More particularly, node 102-1 communicates with storage system 104 over management path 106-1 via a set of one or more drivers 110-1. Similarly, node 102-N communicates with storage system 104 over management path 106-N via a set of one or more drivers 110-N. The drivers 110 associated with the respective management paths 106 illustratively correspond to respective extended engine plugins, such as Docker engine plugins.

The nodes 102 include additional components such as respective grouping modules 112-1, . . . 112-N and respective services modules 114-1, . . . 114-N. The grouping modules 112 provide at least a portion of the container grouping functionality of their respective corresponding ones of the nodes 102, and the services modules 114 facilitate the implementation of data services 115 in the storage system 104 based at least in part on one or more container groups within each of the nodes 102.

In the present embodiment, the nodes 102 are each assumed to comprise at least first and second distinct container groups as illustrated, although different nodes can include different numbers of container groups. Each of the container groups includes multiple containers that are grouped together in accordance with container grouping functionality implemented within the nodes 102.

The containers of the container groups are illustratively configured for executing applications on behalf of one or more tenants of cloud infrastructure of the system 100. Such cloud infrastructure of system 100 illustratively comprises at least portions of the nodes 102 and the storage system 104. For example, different ones of the nodes 102 may be associated with different tenants. Additionally or alternatively, multiple ones of the nodes 102 may be associated with a single one of the tenants.

On each of the nodes 102, the containers implemented by the container host devices are arranged in multiple container groups as illustrated.

For example, the containers on one or more of the nodes 102 are illustratively separated into at least first and second distinct container groups based at least in part on results of comparisons of layer structures each characterizing container images of respective different ones of the containers. An example of a layer structure in one embodiment will be described in more detail below in conjunction with FIG. 2.

The system 100 is configured for group-based container management and data services. In such an arrangement, the particular types of management actions applied to particular containers are determined based at least in part on the container group or groups to which those containers belong. Accordingly, at least one grouping-based container management action is determined for at least one of the containers based at least in part on which of the container groups includes that container. In the case of the above-noted first and second container groups, the grouping-based container management action is illustratively applied to one or more of the containers of one of the first and second container groups but not to the containers of the other of the first and second container groups.

The containers of node 102-1 are more particularly grouped into M container groups denoted 116-1,1 through 116-1,M. Similarly, the containers of node 102-N are more particularly grouped into P container groups denoted 116-N,1 through 116-N,P. The variables N, M, P and other similar variables herein are assumed to be arbitrary positive integers greater than or equal to two, although other values can be used in other embodiments.

Particular management actions are applied to the containers of particular ones of the container groups 116. For example, within a given node such as node 102-1, first grouping-based container management actions may be applied to containers of a first container group such as container group 116-1,1 and second grouping-based container management actions different than the first grouping-based container management actions may be applied to the containers of a second container group 116-1,M. Similarly, within another node such as node 102-N, first grouping-based container management actions may be applied to containers of a first container group such as container group 116-N,1 and second grouping-based container management actions different than the first grouping-based container management actions may be applied to the containers of a second container group 116-N,P.

It is also possible that the same grouping-based container management actions may be applied to similar container groups across multiple nodes. For example, first grouping-based container management actions may be applied to the containers of container group 116-1,1 of node 102-1 and to the containers of container group 116-N,1 of node 102-N, and second grouping-based container management actions different than the first grouping-based container management actions may be applied to the containers of container group 116-1,M of node 102-1 and to the containers of container group 116-N,P of node 102-N. Numerous other applications of container management actions based on container group membership may be implemented within a given embodiment.

Assuming once again by way of example that there are at least first and second distinct container groups 116 in at least one of the nodes 102, the grouping-based container management action illustratively comprises implementing a particular type of host caching partition for each of the containers of the first container group. A different type of host caching partition is implemented for each of the containers of the second group.

As another example, the grouping-based container management action may comprise implementing a particular type of tiering hint policy for each of the containers of the first container group. A different type of tiering hint policy is implemented for each of the containers of the second group.

As a further example, the grouping-based container management action may comprise implementing a particular set of deduplication domains for each of the containers of the first container group. A different set of deduplication domains is implemented for each of the containers of the second container group.

Additional or alternative factors other than layer structure can be used in separating containers into groups for application of different types of container management actions. For example, in other embodiments, the containers may be separated into at least first and second distinct container groups based at least in part on results of comparisons of tenants associated with the containers.

As another example, the containers may be separated into at least first and second distinct container groups based at least in part on results of comparisons of data flows associated with the containers.

Thus, in some embodiments, containers are grouped based on similarities detected between particular ones of the containers across a combination of layer structure, tenants and data flows. Such container grouping functionality is illustratively implemented at least in part by the grouping modules 112 of respective ones of the nodes 102.

In some embodiments, it is possible for one container to be a member of multiple container groups. For example, a first set of container groups can be established based on similarity between containers across a first grouping dimension such as layer structure, and additional sets of container groups can be established based on similarity between containers across additional grouping dimensions such as tenants and data flows.

In addition to the application of different grouping-based container management actions to different ones of the container groups 116, different data services may be implemented for different ones of the container groups 116.

With reference again to the previously-described arrangement involving at least first and second different container groups 116, the different data services can include first and second distinct data caching services for the respective first and second container groups, first and second distinct storage tiering services for the respective first and second container groups, first and second distinct data deduplication services for the respective first and second container groups, first and second distinct networking services for the respective first and second container groups, and first and second distinct data security services for the respective first and second container groups. Numerous other types of data services may additionally or alternatively be implemented for particular containers based on their respective container group memberships as disclosed herein.

The implementation of distinct instances of data services 115 for particular ones of the container groups 116 is illustratively provided on a group-by-group basis utilizing services modules 114 of respective ones of the nodes 102. As noted above, the particular groups of containers for which particular data services are provided can comprise one or more container groups of a single one of the nodes 102 or multiple container groups distributed across multiple ones of the nodes 102.

Changes in layer structure, tenants, data flows and other container grouping parameters are tracked by the grouping modules 112 in the system 100 and comparisons between the containers for grouping purposes are repeated periodically or under other conditions. As a result, the particular containers assigned to certain container groups can vary dynamically over time based on changes in the layer structures, tenants, data flows or other container grouping parameters associated with those containers.

Container group membership can also vary based on addition or deletion of containers to or from one or more of the nodes 102.

As indicated previously, containers may be assigned to the container groups 116 based at least in part on layer structures associated with those containers. For example, a given container may be assigned to a particular one of the container groups 116 based at least in part on whether or not its associated layer structure is within a specified similarity threshold of layer structures of respective other containers previously assigned to that container group.

A layer structure in some embodiments comprises one or more read-only (RO) layers each associated with one or more of container images, and one or more read-write (RW) layers each associated with at least one running instance of at least one of the containers. A more detailed example of such a layer structure will be described below in conjunction with FIG. 2. Other types of layer structures can be used in other embodiments.

As indicated previously, at least portions of the information processing system 100 are implemented in cloud infrastructure. The cloud infrastructure of the system 100 can comprise a public cloud, a private cloud or a hybrid cloud or an associated data center or other type of system implemented on one or more processing platforms. The term "cloud" as used herein is intended to be broadly construed so as to encompass, for example, combinations of multiple clouds of different types.

The nodes 102 are coupled to the storage system 104 over at least one communication network which is not explicitly shown in the figure. Such a network or networks support the data path 105 and management path 106.

In some embodiments, the storage system 104 is implemented as part of the cloud infrastructure of the system 100. Alternatively, the storage system 104 can be implemented at least in part externally to that cloud infrastructure.

As noted above, the containers of the nodes 102 are implemented utilizing a plurality of container host devices. The containers support execution of applications on behalf of one or more tenants of the cloud infrastructure.

For example, cloud native applications can execute in respective application containers implemented utilizing the container host devices. The container host devices may comprise Docker containers, LXD containers, Cloud Foundry Diego-based containers or other types of containers. The data required for execution of the cloud native applications is obtained from the storage system 104.

The storage system 104 can comprise any of a variety of different types of storage including network-attached storage (NAS), storage area networks (SANs), direct-attached storage (DAS), distributed DAS and software-defined storage (SDS), as well as combinations of these and other storage types. The storage platforms can be configured to provide storage for data of multiple distinct types, including blocks, objects and files.

By way of example, as illustrated in the figure, storage system 104 in the present embodiment comprises at least one of network file system (NFS) SAN-based storage and cloud-based storage.

Cloud-based storage of storage system 104 may comprise at least one object store implemented using cloud storage such as Elastic Cloud Storage (ECS) from Dell EMC. Other examples of object stores that can be utilized to provide at least a portion of storage system 104 in some embodiments include Amazon Simple Storage Service (S3), GCP Cloud Storage, and Microsoft Azure Blob Storage.

In some embodiments, the storage system 104 is implemented as a multi-tier storage system comprising at least a fast tier and a capacity tier. The fast tier illustratively comprises non-volatile electronic memory and the capacity tier comprises at least one object store. Tiering hints from applications running in the containers are used to control movement of data between the fast and capacity tiers.

The example storage system configurations described above may be part of the same processing platform or platforms that also implement cloud infrastructure used to provide at least a subset of the nodes 102.

The containers of the nodes 102 are assumed to utilize copy-on-write (COW) techniques to provide point-in-time logical views of the data from storage system 104 that is processed by those containers.

For example, COW allows multiple containers to share access to data stored in the storage system 104. If an application process in a given one of the containers needs to modify a file, block, object or other item of shared data, a separate local copy of that data item is generated on which the given container can make its modifications, while the original shared data item visible to other ones of the containers remains unchanged. These and other COW techniques typically store the resulting multiple copies in the form of layers in which each layer stores only the modifications relative to one or more other layers.

A given running container on one of the nodes 102 of the system 100 is launched utilizing one or more container images. The container images are illustratively part of a layer structure 200 of the type shown in FIG. 2.

Figure 2:
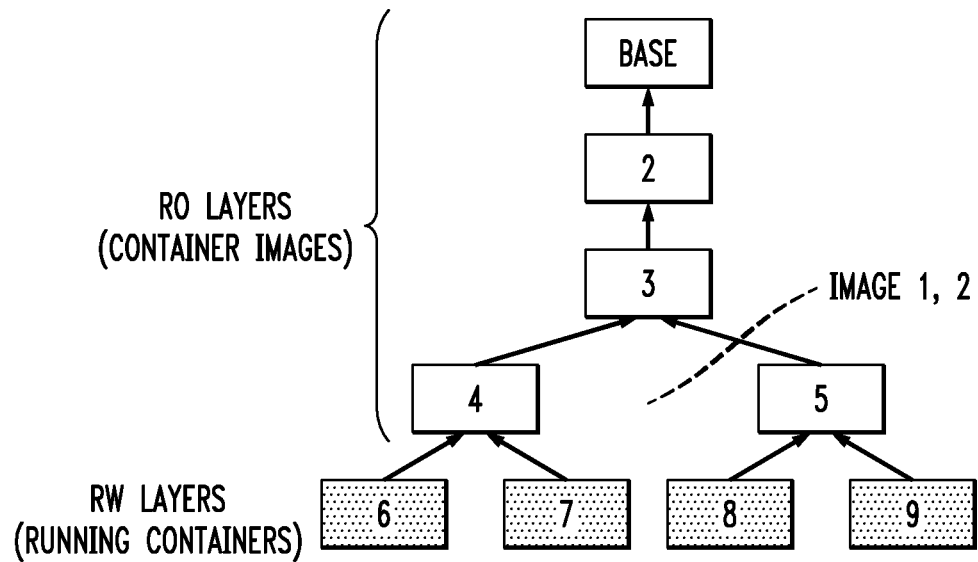
FIG. 2 shows an example of a container image layer structure associated with a plurality of containers in an illustrative embodiment.

In the example layer structure 200 of FIG. 2, there are multiple RO layers associated with respective container images and multiple RW layers associated with multiple running containers that utilize those container images. The RO layers comprise static container images and the RW layers comprise running container instances based on container images that are loaded into memory. The layer structure 200 is in the form of a tree-like hierarchy, with parent-child relationships between the container images of the various layers. Other types of layer structures can be used in other embodiments.

For purposes of illustration, illustrative embodiments will be described herein in the context of the well-known Docker application container framework, although it is to be understood that embodiments can be implemented with other types of container-based application frameworks or snapshot-based applications.

The container images of the respective RO layers in the Docker context include respective differential or "delta" layers each created in conjunction with a corresponding COW operation. A given running container is part of an RW layer and is created utilizing a container image of an immediately overlying RO layer which is itself related back through the layer structure to a base RO layer via one or more intermediate RO layers. Multiple related RO layers of the layer structure therefore collectively provide the single container image that is utilized to generate the given running container.

In the FIG. 2 example, the RO layers of the layer structure include a base RO layer comprising a base container image and intermediate RO layers comprising additional container images denoted 2, 3, 4 and 5. The RW layers of the layer structure include container images denoted 6, 7, 8 and 9 of respective multiple running containers. Such running containers are also referred to as active containers. It can be seen from the figure that active containers corresponding to container images 6 and 7 share container image 4 of the immediately overlying RO layer. Similarly, active containers corresponding to container images 8 and 9 share container image 5 of the immediately overlying RO layer. Container images 4 and 5 of this immediately overlying RO layer in turn relate back to the base RO layer via container images 3 and 2 of respective intermediate RO layers.

The active containers can read data items referenced by the container images of the RO layers. If a given one of the active containers wants to modify one or more of those data items, a COW operation is performed and the given active container can then perform write operations on its local copy. Such modifications lead to one or more additional differential container images of one or more RO layers. For example, a temporary RW layer may be created via COW for a given active container, and later removed after run or commit in conjunction with generation of a new durable RO layer. Accordingly, the layer structures of the system 100 vary over time as the containers access and modify data items associated with the various container images of those layer structures.

Container image layer structures of the type described above can grow increasingly complex, particularly in dense container deployments. Accordingly, illustrative embodiments can incorporate efficient container image layer structure access and processing techniques as disclosed in U.S. patent application Ser. No. 15/189,447, filed Jun. 22, 2016, now U.S. Pat. No. 10,061,520, and entitled "Accelerated Data Access Operations," and U.S. patent application Ser. No. 15/195,451, filed Jun. 28, 2016, now U.S. Pat. No. 10,534,671, and entitled "Container Image Layer Compaction," both of which are incorporated by reference herein in their entirety. Such techniques provide significant improvements in the processing of large numbers of potentially complex container image layer structures with a given dense container deployment.

Illustrative embodiments automatically group containers based at least in part on detected similarities in their corresponding container image layer structures, and possibly also based on other detected similarities in other relevant container parameters such as tenants and data flows, and then apply different grouping-based container management actions to different containers based at least in part on their respective assigned groups. Additionally or alternatively, different data services are implemented for different containers based at least in part on their respective assigned groups.

Figure 3:
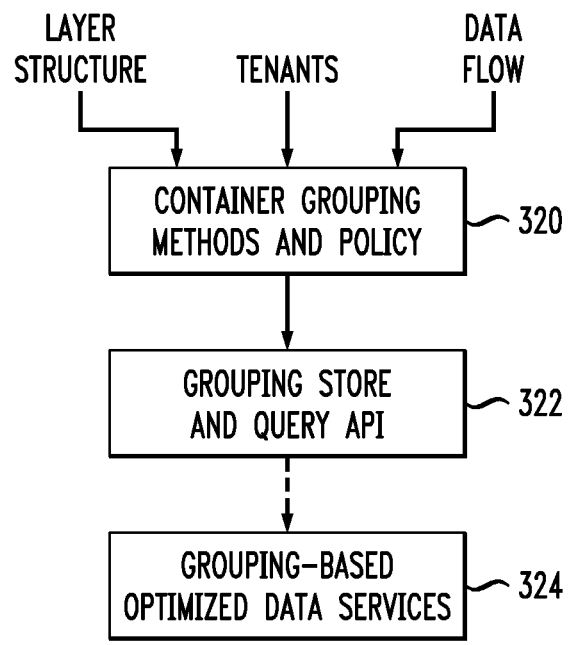
FIG. 3 shows techniques for provision of grouping-based container management and associated data services in an illustrative embodiment.

FIG. 3 shows an example set of interrelated techniques 300 for provision of grouping-based container management and associated data services in an illustrative embodiment. The techniques 300 in this embodiment include container grouping methods and policy 320 that are illustratively based on grouping parameters including layer structure, tenants and data flows. This embodiment further comprises a grouping store and query application programming interface (API) 322 illustratively utilized to provide group membership information from grouping modules to services modules and other service-related components within the system. Such information obtained via the API 322 is utilized by the services modules and other service-related components to implement grouping-based optimized data services 324.

These techniques are utilized in the present embodiment to bind numbers of similar or relevant containers as a logical group for scalable container management and provision of optimized data services.

For example, as indicated previously, similarity between containers in some embodiments is measured by comparing their corresponding layer structures. Similar containers selected for grouping in some embodiments will have similar workloads and that will be reflected in their corresponding layer structures. Active containers that commit or otherwise write certain types of changes in similar manners, possibly involving libraries, configuration files and the like, will tend to exhibit similar container image layer structures that can be automatically detected using techniques of the type disclosed herein.

In the context of the example layer structure 200 of FIG. 2, container images 4 and 5 each have two running containers associated therewith, and share common intermediate and base RO layers. A grouping module such as one of the grouping modules 112 within one of the nodes 102 in the FIG. 1 embodiment can automatically identify similarities in layer structure between multiple containers and group those containers together for application of container management actions and associated data services. For example, running containers 6 and 7 share container image 4 and accordingly can be grouped together into a first container group. Similarly, running containers 8 and 9 share container image 5 and accordingly can be grouped together into a second container group. Other containers that share a common container image in this manner can similarly be assigned to the first or second container groups.

The particular layer structure similarities that if detected will cause the corresponding containers to be grouped together can be specified by one or more configurable criteria of the system.

Another example of a layer structure similarity criterion for assigning containers to the same group can be sharing of the second-to-last RO layer. If such a criterion were applied in the FIG. 2 layer structure, running containers 6 through 9 would be assigned to the same container group based on the fact that those containers all share a common second-to-last RO layer container image, namely, container image 3.

Other examples of container grouping criteria based on corresponding layer structure can include sharing of a particular number of uppermost RO layers, such as the top two or three RO layers, or sharing of a base RO layer.

In these and other arrangements, similar containers are automatically grouped into container groups based on their associated container image layer structures. Comparison of layer structures can illustratively involve checking the parent-child relationships between the container image layers for common features. Such layer structure comparisons between containers can be performed at least in part by querying readily available layer metadata, using in-memory techniques which are not only fast and lightweight, but also robust relative to comparison of container names.

With regard to detection of tenant-related similarities, containers that are subject to the same tenant-specified security or isolation policy may be considered sufficiently similar for container grouping purposes. Comparisons of these parameters between containers can utilize designated similarity thresholds to determine automatically if particular containers should be assigned to the same group.

Containers owned by the same tenant based on a user identifier ("UserID") or other information can be automatically grouped if the containers meet the particular grouping policies in place. Some embodiments may not permit cross-tenant grouping of containers unless explicitly specified as permissible by the corresponding tenants.

Similarly, in the case of data flow based similarities, containers implementing common web, caching or database related data flows, possibly as part of a vertical microservices stack, may be considered sufficiently similar for container grouping purposes. Again, comparisons of these parameters between containers can utilize designated similarity thresholds to determine automatically if particular containers should be assigned to the same group.

It is to be appreciated that various combinations of the above-described layer structures, tenants and data flows, as well as additional or alternative parameters, may be used to assign containers to container groups for purposes of container management and optimized data services provision in other embodiments. In some of the comparisons, such that those based on data flows, user input may be taken into account. Comparisons based on tenants and data flows can consider factors such as security and data flow locality.

The containers assigned to a given group can share container management settings relating to storage, networking, security and other features. For example, storage features such as host caching partitions, tiering hints and deduplication domains can be separately optimized for each of the container groups.

As a more particular example, containers relating to Tensorflow generally require strong read performance to load training samples, and also powerful processing resources, while containers relating to Redis generally require a large memory cache. Accordingly, Tensorflow-related containers can be assigned to a first container group subject to satisfaction of other policy-based similarity criteria while Redis-related containers are assigned to a second container group, again subject to satisfaction of other policy-based similarity criteria. Distinct deduplication services can be provided for the respective first and second container groups in this example, as it is unlikely that significant common deduplication benefits can be achieved across both Tensorflow-related and Redis-related containers.

Networking and security services can similarly be configured on a per-grouping basis so as to optimize such services for the particular needs of each container group. This may involve, for example, ensuring achievement of particular Quality of Service (QoS) objectives for each of the container groups.

Explicit specifications associated with a given container may in some cases take precedence over such grouping-based shared container management settings.

A given container group is illustratively provided with a unique group identifier ("GroupID") and may additionally or alternatively have a readable name such as "auto_group_ubuntu." Additional information associated with the container group identifier may include one or more time stamps or other notational information relating to the corresponding container group. Such container group information is illustratively stored as part of existing container metadata, which may include container name, container timestamp, hash values, etc. The grouping store and query API 322 of FIG. 3 allows efficient access to the container group information.

In some embodiments, the container grouping process is implemented in an inline manner such that assignment of containers to groups can vary dynamically as changes are detected in the container image layer structures. An inline process of this type is illustratively configured to track container image layer structure changes such as pulling of new container images or committing of new container images.

Figure 4:
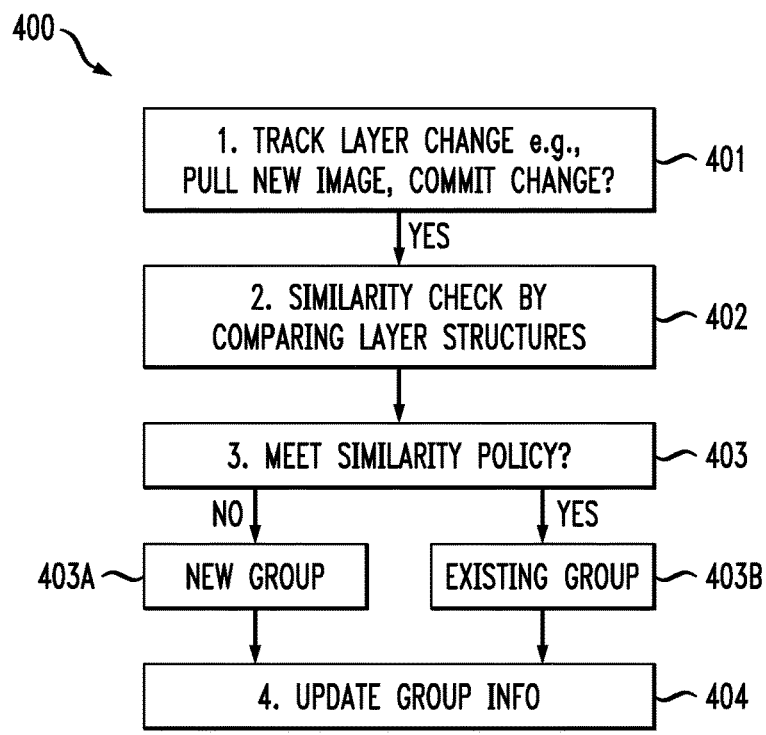
FIG. 4 is a flow diagram of a process for grouping containers in an illustrative embodiment.

An example of one possible implementation of an inline process 400 for container grouping is shown in FIG. 4. The container grouping process 400 in this embodiment includes steps 401, 402, 403 and 404, also denoted as steps 1, 2, 3 and 4, respectively. Step 403 includes sub-steps denoted 403A and 403B.

It is assumed in this embodiment that the process 400 runs within a given one of the grouping modules 116 within a corresponding one of the nodes 102 of the system 100 of FIG. 1. Other instances of the process 400 are assumed to be implemented in other ones of the nodes 102. In other embodiments, a multi-node container grouping process can be implemented for grouping of containers across multiple nodes.

In step 401, the grouping module tracks layer changes. For example, the grouping module can monitor user operations that may add or modify the layer structures of the containers. Such operations illustratively including pulling a new container image or committing to changes in one or more container image layers. Responsive to detection of such a change or a threshold number of such changes in a given one of the containers, the process moves to step 402.

In step 402, a similarity check is performed by comparing layer structures between the given container and one or more other containers. Current container layer structure information for the containers used in this comparison can be obtained via an existing metadata API that provides such information.

In step 403, a determination is made as to whether or not the applicable similarity policy is satisfied. If the similarity policy is not satisfied, a new group may be initiated to include the given container in sub-step 403A. Alternatively, if the similarity policy is satisfied, the given container is added to the appropriate existing group in sub-step 403B. The process will then move to step 404 as indicated.

In step 404, the group information of the given container is updated. As indicated previously, such information illustratively includes a GroupID and may be stored in conjunction with other container metadata.

The process 400 is assumed to run substantially continuously in order to detect layer structure changes in one or more containers and to initiate similarity comparisons with other containers. The container groupings will therefore vary dynamically over time in accordance with changes in the layer structures of the containers.

The process 400 can be supplemented with additional comparison dimensions, such as the tenant and data flow dimensions previously described. For example, tenants can be taken into account through automated filtering based on UserID, while data flow grouping can be based at least in part on user input regarding which containers should be correlated for container grouping purposes.

As mentioned previously, some embodiments are configured such that a given container belongs to only one group, although other embodiments can support container membership in multiple groups. The container group information of a given container is illustratively stored in pre-defined metadata files with other container metadata. One or more APIs are provided to allow access to such container group information. For example, an API can be configured to support various container grouping information queries such as listing all container groups and listing all containers in a specified group. Container grouping information can be updated or removed as necessary within the system.

As mentioned previously, the process 400 of FIG. 4 is an example of an inline implementation of a container grouping process. Other embodiments can implement offline container grouping processes. For example, a background thread can be used to periodically scan container image layer structures and group the corresponding containers based on similarities in their layer structures.

Figure 5:
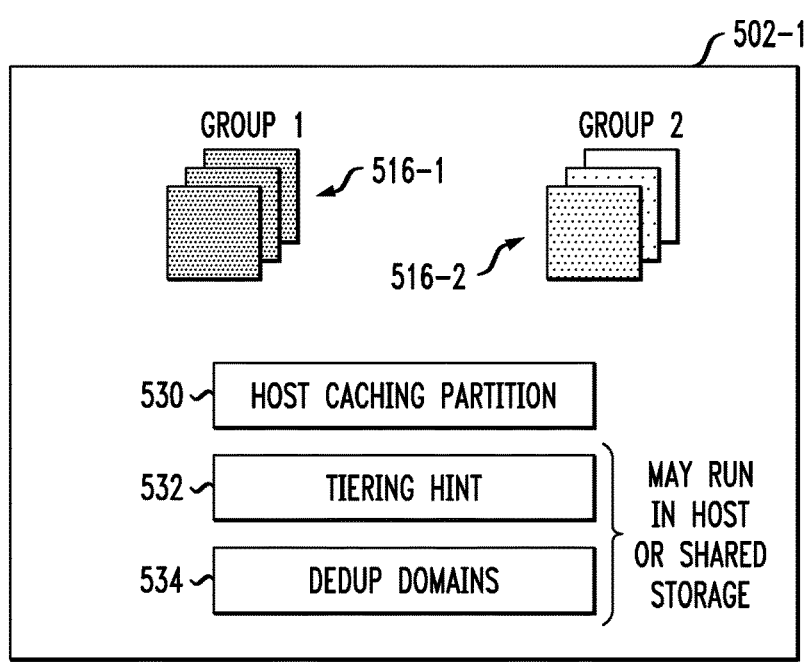
FIG. 5 shows examples of different types of data services that are provided in conjunction with grouping-based container management in an illustrative embodiment.

Referring now to FIG. 5, examples are shown of different types of data services that are provided in conjunction with grouping-based container management in an illustrative embodiment.

In this embodiment, an information processing system 500 comprises a node 502-1 and may comprise one or more additional nodes that are not explicitly shown. The node 502-1 includes two container groups 516-1 and 516-2, also denoted as Group 1 and Group 2, respectively, each of which comprises a plurality of containers. Although only two container groups are shown in this example, other embodiments can include additional container groups. Each such container group illustratively comprises multiple containers implemented by container host devices of the node 502-1. A given one of the container groups 516 can include containers implemented on different container host devices of the node 502-1.

Different types of three different data services are provided to the containers of the container groups 516-1 and 516-2 based on their respective group memberships. The data services can thereby be optimized for the particular characteristics of the containers of each of the container groups. The data services in this embodiment comprise respective storage services, such as host caching partition service 530, tiering hint service 532 and deduplication domains service 534. The tiering hint service 532 and deduplication domains service 534 may run in the corresponding container host devices ("host") or in an associated shared storage system, which is not explicitly shown.

The services 530, 532 and 534 are illustratively optimized on a per-group basis based on common characteristics of the containers of each group. For example, these and other storage data services can be configured to fully exploit container similarity across storage dimensions such as workload, data access pattern, performance demands, etc. References in this context to storage may refer to various types of storage, including by way of example storage of container images and/or mounted storage elements for a given application running in one of the containers of the container group.

The host caching partition service 530 illustratively provides particular distinct implementations of page caching as well as second-level caching for the containers of the different container groups 516. Particular caching algorithms and associated features such as page cache swapping and cache capacity can be configured on a per-group basis in order to maximize caching efficiency for the containers of each container group. These and other types of caching functionality can be implemented using one or more instances of Dell EMC Fluid Cache executing in the host and configured to support the container groups.

The tiering hint service 532 illustratively provides different storage tiering arrangements for the different container groups 516. For example, a per-group tiering policy can be established to control the movement of data between fast and capacity tiers of a multi-tier storage system. A container group that includes containers running a highly critical application with frequent random IO accesses can have its data stored primarily in solid-state storage devices of the fast tier, while another container group that includes containers running less critical applications with sequential IO accesses can have its data stored primarily in disk-based storage devices of the capacity tier. The storage tiering functionality can be implemented in the host or in one or more storage arrays of the storage system.

The deduplication domains service 534 illustratively provides different sets of deduplication domains for the different container groups 516. For example, deduplication domains are selected for each container group such that expected deduplication benefit is optimized within the container group. This may also involve use of different types of inline or offline deduplication for the different container groups.

These and other grouping-based storage services can comprise newly-built storage services particularly configured to take advantage of the container grouping functionality as well as modification of existing storage services.

The services 530, 532 and 534 in this embodiment are examples of grouping-based data services relating to storage functionality of the system 500, and other types of data services, possibly relating to other system features such as networking and security, can be provided in other embodiments. For example, the use of container groups as disclosed herein provides a moderate granularity in data services optimization, intermediate between a course global granularity applicable to all containers and a fine per-container granularity. Different types of networking and security services can be provided for different types of containers in a particularly efficient manner utilizing this moderate granularity of group-based container management and data services optimization.

As more particular examples, a grouping-based networking service can utilize different types of networking drivers, such as Weave-based networking drivers and Kuryr networking drivers, for different ones of the container groups 516, and/or different types of queue depth and quota throttling parameters to achieve different levels of IO operations per second (IOPS) or other QoS metrics for different ones of the container groups 516.

In some embodiments, grouping-based container management and data services functionality is integrated with existing system functionality. For example, existing container monitoring and metadata configurations can be extended in a straightforward manner to support container groups as disclosed herein. Grouping modules such as grouping modules 112 of FIG. 1 can be provided as part of an extended engine plugin of a Docker engine or other type of container control engine. Existing APIs can be extended or new APIs added to support access to container group information.

The disclosed grouping-based container management and data services functionality can be readily integrated with existing container management technologies such as SWARM and Kubernetes.

In addition, the disclosed grouping-based container management and data services functionality can be utilized with a wide variety of different types of storage systems, including storage systems comprising ScaleIO™ software-defined storage and/or Isilon® platform nodes, both from Dell EMC. For example, a given multi-tier storage system referred to herein can include a fast tier implemented at least in part using ScaleIO™ software-defined storage and a capacity tier implemented at least in part utilizing a scale-out NAS cluster comprising Isilon® platform nodes. Both ScaleIO™ and Isilon® support Docker volume plug-ins using REX-Ray. Numerous other storage systems can be used in other embodiments.

Accordingly, illustrative embodiments can be implemented at least in part utilizing an extended engine plugin configured to support container grouping functionality as disclosed herein. Such an extended engine plugin can be configured to operate in conjunction with existing COW infrastructure such as a Docker engines backed by COW DeviceMapper and Advanced multi-layered Unification File System (AUFS) storage drivers. Other snapshot frameworks can be used in other embodiments.

Container grouping functionality such as that described above in conjunction with illustrative embodiments can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

It should be noted that the particular arrangements illustrated in FIGS. 1 through 5 are presented by way of illustrative example only, and should not be construed as limiting in any way. As noted above, the described grouping-based container management and data services functionality can be implemented using additional or alternative components. Accordingly, a wide variety of different grouping-based container management and data services arrangements can be used in other embodiments.

The illustrative embodiments described above provide significant advantages over conventional arrangements.

For example, container grouping of the type described in conjunction with illustrative embodiments herein provides scalable and highly efficient grouping-based container management and associated data services optimization.

In addition, container grouping supports a beneficial moderate granularity in data services optimization, intermediate between a course global granularity applicable to all containers and a fine per-container granularity. As a result, containers can be more efficiently managed and system performance is improved in terms of data services relating to storage, networking, security and other features.

It is to be appreciated that the particular advantages described above and elsewhere herein are associated with particular illustrative embodiments and need not be present in other embodiments.

Also, the particular types of information processing system features and functionality as illustrated in the drawings and described above are exemplary only, and numerous alternative arrangements may be used in other embodiments.

The information processing systems disclosed herein are illustratively implemented using one or more processing platforms, examples of which will be now be described in greater detail. A given such processing platform comprises at least one processing device comprising a processor coupled to a memory.

As mentioned previously, portions of an information processing system as disclosed herein illustratively comprise cloud infrastructure. The cloud infrastructure in some embodiments comprises a plurality of containers implemented using container host devices and may additionally or alternatively comprise other types of virtual resources such as virtual machines implemented using a hypervisor. Such cloud infrastructure can therefore be used to provide what is also referred to herein as a cloud computing environment. A given cloud computing environment may but need not accommodate multiple tenants.

The cloud infrastructure mentioned above may represent at least a portion of one processing platform. Another example of such a processing platform is a plurality of processing devices which communicate with one another over a network. Each such processing device comprises at least one processor coupled to at least one memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as nodes 102, or portions thereof, are illustratively implemented for use by respective tenants of such a multi-tenant environment.

As mentioned previously, cloud infrastructure as disclosed herein can include cloud-based systems such as AWS, GCP and Microsoft Azure. Virtual machines provided in such systems can be used to implement containers that are grouped based on layer structures and possibly other parameters for purposes of container management and data services in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of LXC. The containers may run on virtual machines in a multi-tenant environment, although other arrangements are possible. The containers may be utilized to implement a variety of different types of functionality within the system 100. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. Although described in the context of system 100, these platforms may also be used to implement at least portions of other information processing systems in other embodiments.

Figure 6:
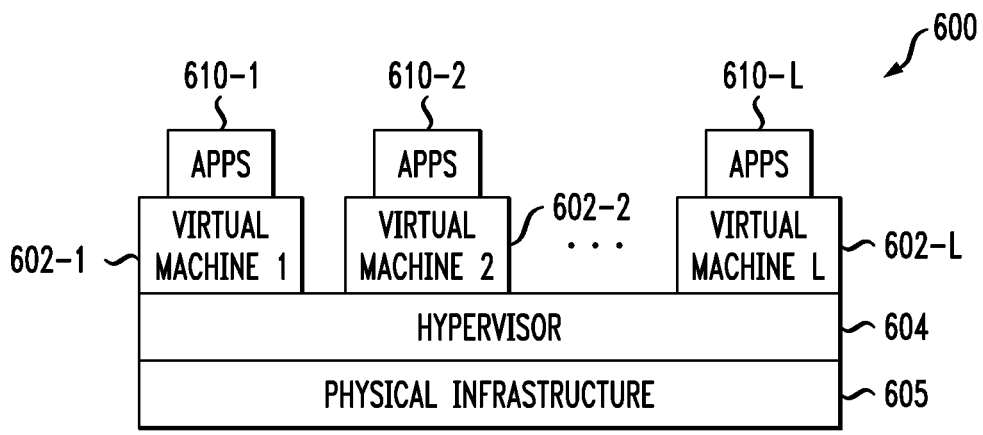
FIGS. 6 and 7 show examples of processing platforms that may be utilized to implement at least a portion of an information processing system in illustrative embodiments.
Figure 7:
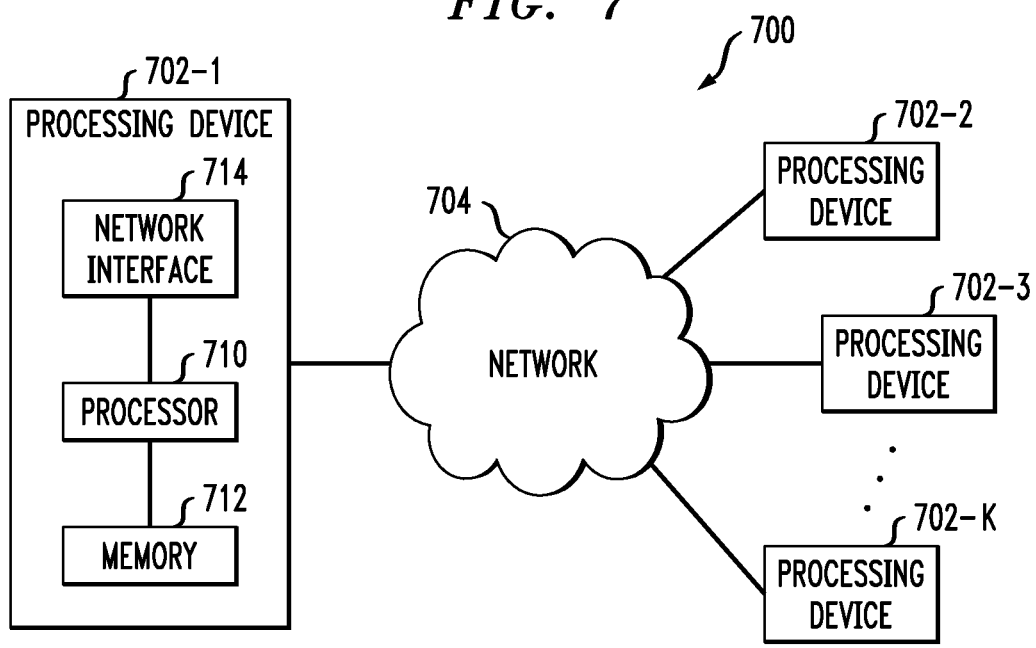

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises virtual machines (VMs) 602-1, 602-2, . . . 602-L implemented using a hypervisor 604. The hypervisor 604 runs on physical infrastructure 605. The cloud infrastructure 600 further comprises sets of applications 610-1, 610-2, . . . 610-L running on respective ones of the virtual machines 602-1, 602-2, . . . 602-L under the control of the hypervisor 604.

Although only a single hypervisor 604 is shown in the embodiment of FIG. 6, the system 100 may of course include multiple hypervisors each providing a set of virtual machines using at least one underlying physical machine. Different sets of virtual machines provided by one or more hypervisors may be utilized in configuring multiple instances of various components of the system 100.

An example of a hypervisor platform that may be used to implement hypervisor 604 and possibly other portions of the information processing system 100 in one or more embodiments is the VMware® vSphere® which may have an associated virtual infrastructure management system such as the VMware® vCenter™. The underlying physical machines may comprise one or more distributed processing platforms that include one or more storage systems.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA) or other type of processing circuitry, as well as portions or combinations of such circuitry elements.

The memory 712 may comprise random access memory (RAM), read-only memory (ROM) or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure from VCE, the Virtual Computing Environment Company, now the Converged Platform and Solutions Division of Dell EMC.

These and numerous other alternative cloud computing environments can be configured to implement grouping-based container management and data services as disclosed herein.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of container groups and associated data services are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, cloud infrastructure, processing platforms, nodes, containers, container host devices, container grouping techniques, drivers, data services and storage systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   a plurality of container host devices;
   the container host devices implementing a plurality of containers for executing applications on behalf of one or more tenants of a cloud infrastructure;
   the containers being separated into at least first and second container groups based at least in part on results of comparisons of layer structures each characterizing container images of respective different ones of the containers;
   wherein a given one of the layer structures comprises:
      one or more read-only layers each associated with one or more of the container images; and
      one or more read-write layers each associated with at least one running instance of at least one of the containers;
   wherein at least one grouping-based container management action is determined for at least one of the containers based at least in part on which of the first and second container groups includes that container; and
   wherein the grouping-based container management action is applied to one or more of the containers of one of the first and second container groups but not to the containers of the other of the first and second container groups;
   the container host devices being implemented on at least one processing platform comprising a processor coupled to a memory.

2. The apparatus of claim 1 wherein at least a subset of the container host devices comprise respective virtual machines controlled by a hypervisor of the processing platform.

3. The apparatus of claim 1 wherein the container host devices are configured as a plurality of nodes each comprising at least first and second distinct container groups and sharing a common storage system.

4. The apparatus of claim 1 wherein the at least one grouping-based container management action determined for at least one of the containers based at least in part on which of the container groups includes that container comprises:
   first grouping-based container management actions that are applied to the containers of the first container group; and
   second grouping-based container management actions, different than the first grouping-based container management actions, that are applied to the containers of the second container group.

5. The apparatus of claim 1 wherein the grouping-based container management action comprises implementing a particular type of host caching partition for each of the containers of the first container group and wherein a different type of host caching partition is implemented for each of the containers of the second container group.

6. The apparatus of claim 1 wherein the grouping-based container management action comprises implementing a particular type of tiering hint policy for each of the containers of the first container group and wherein a different type of tiering hint policy is implemented for each of the containers of the second container group.

7. The apparatus of claim 1 wherein the grouping-based container management action comprises implementing a particular set of deduplication domains for each of the containers of the first container group and wherein a different set of deduplication domains is implemented for each of the containers of the second container group.

8. The apparatus of claim 1 wherein the containers are separated into said at least first and second container groups based at least in part on results of comparisons of tenants associated with the containers.

9. The apparatus of claim 1 wherein the containers are separated into said at least first and second container groups based at least in part on results of comparisons of data flows associated with the containers.

10. The apparatus of claim 1 wherein different data services are implemented for the respective first and second container groups.

11. The apparatus of claim 10 wherein the different data services comprise at least one of (a) through (e) below:
 (a) first and second distinct data caching services for the respective first and second container groups;
 (b) first and second distinct storage tiering services for the respective first and second container groups;
 (c) first and second distinct data deduplication services for the respective first and second container groups;
 (d) first and second distinct networking services for the respective first and second container groups; and
 (e) first and second distinct data security services for the respective first and second container groups.

12. The apparatus of claim 1 wherein changes in the layer structures are tracked and the comparisons repeated such that the first and second container groups vary dynamically over time.

13. The apparatus of claim 1 wherein a given container is assigned to a particular one of the first and second container groups based at least in part on whether or not its associated layer structure is within a specified similarity threshold of layer structures of respective other containers previously assigned to that container group.

14. A method comprising:
 configuring a plurality of container host devices in a cloud infrastructure;
 utilizing the container host devices to implement a plurality of containers for executing applications on behalf of one or more tenants of the cloud infrastructure;
 comparing layer structures each characterizing container images of respective different ones of the containers;
 separating the containers into at least first and second container groups based at least in part on results of comparisons of the layer structures;
 determining at least one grouping-based container management action to be applied to at least one of the containers based at least in part on which of the first and second container groups includes that container; and
 applying the grouping-based container management action to one or more of the containers of one of the first and second container groups but not to the containers of the other of the first and second container groups;
 wherein a given one of the layer structures comprises:
  one or more read-only layers each associated with one or more of the container images; and
  one or more read-write layers each associated with at least one running instance of at least one of the containers;
 the method being performed by at least one processing platform comprising a processor coupled to a memory.

15. The method of claim 14 wherein the at least one grouping-based container management action determined for at least one of the containers based at least in part on which of the container groups includes that container comprises:
 first grouping-based container management actions that are applied to the containers of the first container group; and
 second grouping-based container management actions, different than the first grouping-based container management actions, that are applied to the containers of the second container group.

16. A computer program product comprising a non-transitory processor-readable storage medium having stored therein program code of one or more software programs, wherein the program code when executed by at least one processing platform comprising a processor coupled to a memory causes the processing platform:
 to configure a plurality of container host devices in a cloud infrastructure;
 to utilize the container host devices to implement a plurality of containers for executing applications on behalf of one or more tenants of the cloud infrastructure;
 to compare layer structures each characterizing container images of respective different ones of the containers;
 to separate the containers into at least first and second container groups based at least in part on results of comparisons of the layer structures;
 to determine at least one grouping-based container management action to be applied to at least one of the containers based at least in part on which of the first and second container groups includes that container; and
 to apply the grouping-based container management action to one or more of the containers of one of the first and second container groups but not to the containers of the other of the first and second container groups;
 wherein a given one of the layer structures comprises:
  one or more read-only layers each associated with one or more of the container images; and
  one or more read-write layers each associated with at least one running instance of at least one of the containers.

17. The computer program product of claim 16 wherein the at least one grouping-based container management action determined for at least one of the containers based at least in part on which of the container groups includes that container comprises:
 first grouping-based container management actions that are applied to the containers of the first container group; and
 second grouping-based container management actions, different than the first grouping-based container management actions, that are applied to the containers of the second container group.

18. The computer program product of claim 16 wherein the grouping-based container management action comprises implementing a particular type of host caching partition for each of the containers of the first container group and wherein a different type of host caching partition is implemented for each of the containers of the second container group.

19. The computer program product of claim 16 wherein the grouping-based container management action comprises implementing a particular type of tiering hint policy for each of the containers of the first container group and wherein a different type of tiering hint policy is implemented for each of the containers of the second container group.

20. The computer program product of claim 16 wherein the grouping-based container management action comprises implementing a particular set of deduplication domains for each of the containers of the first container group and wherein a different set of deduplication domains is implemented for each of the containers of the second container group.

* * * * *